United States Patent [19]

Lynn et al.

[11] Patent Number: 5,234,470
[45] Date of Patent: Aug. 10, 1993

[54] MEDIA FOR USE IN PRESSURIZED DEVICE AND METHOD OF FARMING

[76] Inventors: William R. Lynn, 38 Prospect St., Dover, N.H. 03820; Wilfred P. Parent, Northeast Pond Rd., Milton, N.H. 03851

[21] Appl. No.: 843,450
[22] Filed: Feb. 28, 1992
[51] Int. Cl.⁵ ............................................. B24D 3/00
[52] U.S. Cl. ..................................... 51/293; 51/298; 51/317; 51/320
[58] Field of Search .................. 51/293, 298, 317, 320

[56] References Cited

U.S. PATENT DOCUMENTS

| | | | |
|---|---|---|---|
| 1,444,648 | 2/1923 | Willis et al. | 222/236 |
| 1,559,666 | 11/1925 | Bernier | 222/241 |
| 1,752,956 | 4/1930 | Lex | 222/241 |
| 2,426,072 | 8/1947 | Wall et al. | 51/282 |
| 2,597,434 | 5/1952 | Bishop et al. | 51/12 |
| 2,624,988 | 1/1953 | Vander Wal | 282/51 |
| 2,652,662 | 9/1953 | Newell | 51/12 |
| 2,910,812 | 11/1959 | Brunner | 51/282 |
| 3,313,067 | 4/1967 | Smith et al. | 51/320 |
| 3,461,478 | 8/1969 | Taylor | 15/302 |
| 3,521,407 | 7/1970 | Nalley et al. | 51/12 |
| 3,634,973 | 1/1972 | McCarty | 51/317 |
| 3,716,066 | 2/1973 | Currier et al. | 134/17 |
| 4,158,576 | 6/1979 | Butz | 134/7 |
| 4,439,073 | 3/1984 | White | 406/125 |
| 4,534,139 | 8/1985 | Desjardins | 51/438 |
| 4,545,155 | 10/1985 | Nakata | 51/320 |
| 4,589,234 | 5/1986 | Rebham et al. | 51/417 |
| 4,731,125 | 3/1988 | Carr | 134/17 |
| 4,827,678 | 5/1989 | MacMillan et al. | 51/320 |
| 4,832,706 | 5/1989 | Yates | 51/293 |
| 4,970,830 | 11/1990 | Schlick | 51/436 |
| 5,024,029 | 6/1991 | Abbott et al. | 51/438 |

FOREIGN PATENT DOCUMENTS

| | | |
|---|---|---|
| 1266219 | 4/1968 | Fed. Rep. of Germany . |
| 2840029 | 11/1979 | Fed. Rep. of Germany . |
| 58-202777 | 11/1983 | Japan . |
| 422119 | 1/1935 | United Kingdom . |
| 816363 | 7/1959 | United Kingdom . |
| 2128911 | 5/1984 | United Kingdom . |

Primary Examiner—Mark L. Bell
Assistant Examiner—Willie J. Thompson
Attorney, Agent, or Firm—Davis, Bujold & Streck

[57] ABSTRACT

A composite media comprising a plurality of discrete particles of an abrasive component mixed with and attached to a carrier component. The abrasive component and the carrier component are selected to provide desired wear of the composite media, during use, to expose additional underlying abrasive material and to enhance cleaning of the surface being treated. The composite media facilitates feeding of the blasting media and results in deeper penetration of the blasting media into the surface being treated. A method for forming the mixture of the composite media is also disclosed.

20 Claims, 7 Drawing Sheets

MEDIA FOR USE IN PRESSURIZED DEVICE AND METHOD OF FARMING

FIELD OF THE INVENTION

This invention relates to an improved media for use in suitable blasting equipment which propels the media, via a pressurized air stream, against a surface of an object to dislodge and/or absorb any contaminant thereon. The contaminant or contaminants to be removed may include any foreign substance attached to or carried by the surface such as hazardous materials, soil, grease, oil, paint, soot, solvents and other objectionable deposits.

BACKGROUND OF THE INVENTION

A variety of blasting media are presently known and employed in the blasting art. Although the known blasting medias may be suitable for some applications, such medias are either marginally acceptable or unacceptable for other applications, especially where excessive wear or damage to the surface being cleaned must be avoided or improved surface preparation must be achieved.

A further problem associated with known blasting media is that upon impact of the blasting media against a surface being cleaned, the blasting media tends to at least partially disintegrate into small particulate matter causing dust. Such breakdown of the blasting media promotes a larger consumption of the blasting media and thereby results in inefficient use of the blasting material. In addition, due to a variety of inefficiencies occurring during discharge of the media from the pressurized blasting device, the treatment of the surface by the blasting media is not as effective as it could be with a more efficient blasting media.

Wherefore, it is an object of the invention to provide a media which overcomes the aforementioned problems associated with prior art medias and achieves suitable surface preparation and cleaning of the article to be treated.

A further object of the present invention is to provide blasting media which increases penetration of the abrasive material into the surface being treated so that the treated surface has a better surface profile to facilitate the application of a material, such as paint, to the treated surface.

A still further object of the invention is to provide an improved blasting media which minimizes the consumption of media and also minimizes the amount of dust created during surface treatment of an object.

Another object of the invention is to provide media which can be efficiently discharged from suitable blasting equipment thereby to maximize the blasting media's impact and penetration into the surface being treated.

Yet another object of the invention is to limit rebound of the blasting media, after impacting against the surface being cleaned, by absorbing a substantial portion of the rebound energy of the blasting media via a media carrier component.

Still another object of the invention is to facilitate rebuilding, recombining, reuse and/or repairing of the blasting media on site to minimize the waste associated with blasting and maximize the efficiency of blasting media.

A still further object of the invention is to provide media which consists of a plurality of abrasive components combined with one another by at least one carrier component so as to form a larger particle to assist with deeper surface penetration and more effective cleaning. The carrier component can be selected so as to chip, peel or wear at a desired rate, preferably faster than the abrasive material, whereby further abrasive material is exposed as the carrier component wears away for treating the surface.

These and other objects of the invention will become apparent and better understood by those skilled in the art by having reference to the appended drawings and the following description.

SUMMARY OF THE INVENTION

The present invention relates to a composite blasting media for use in treating a surface to remove undesired contaminants therefrom, said composite media comprising a plurality of individual discrete particles each containing a plurality of discrete particles of an abrasive component being interconnected with one another by a carrier component to form the plurality of individual discrete particles, wherein the carrier component of each composite media particle wears, during use, at a rate so as to continuously expose additional underlying abrasive particles on an exterior surface of that composite media particle but not at a rate to allow the premature separation of the abrasive particles from the exterior surface of that composite media particle.

The present invention further relates to a method of forming a composite blasting media for use in treating a surface to remove undesired contaminants therefrom, said method comprising the steps of forming a plurality of individual discrete particles each containing a plurality of discrete particles of an abrasive component interconnected with one another by a carrier component to form the plurality of individual discrete composite blasting media particles, and selecting the carrier component which wears, during use of the composite blasting media, at a rate so as to continuously expose additional underlying abrasive particles on an exterior surface of that composite media particle but not at a rate to allow the premature separation of the abrasive particles from the exterior surface of that composite media particle.

BRIEF DESCRIPTION OF THE DRAWINGS

The invention will now be described, by way of example, with reference to the accompanying drawings in which.

DESCRIPTION OF THE PREFERRED EMBODIMENTS

In accordance with one form of the present invention a lipophilic/hydrophilic, flexible, open cell water-foamable polymeric material such as a polyurethane-Wollastonite and/or staurolite interpolymer is obtained by a chemical reaction under foam forming and interpolymer conditions. The term "interpolymer" is used to indicate that the polyurethane is somehow bound to the abrasive mineral such as garnet or Wollastonite by some sort of bonding whether hydrogen bonding, chemical bonding or by complex or by adsorptive or absorptive bonding, rather than being merely an admixture of the components as in the prior art. The bonding can be combinations of the above. The invention is not limited thereto. The interpolymer of the invention can be for example the cured product of a mixture of substantially linear isocyanate capped polyether polyol prepolymer, having an average functionality of less than 2, a cell formation regulating amount of surfactant and water.

Preferably the invention comprises a lipophilic flexible open cell urethane-Wollastonite interpolymer obtained by reacting, under interpolymer and urethane forming conditions, (a) a substantially linear isocyanate capped prepolymer having a reactive functionality of less than 2 mixed with (b) an aqueous solution comprising Wollastonite and surfactant. Preferably the interpolymer has an active functionality of from about 1.3 to about 1.9, and more preferably of from about 1.5 to about 1.8. The linear polyether polyol is derived from a difunctional, active hydrogen-containing initiator and one or more 1,2-epoxides which will impart hydrophilic properties to the resulting polyol, or from ethylene glycol and thylene oxide or prepared from a substantially linear polyether polyol of the general formula $H(OCH_2CH)_mOCH_2CH^2O(CH_2CH_2O)_nH$ wherein m and n each is an integer of from 2 to about 250 and m and n taken together is an integer of from about 3 to about 500, preferably in which m and n each is an integer of from about 5 to about 80 and m and n taken together is an integer of from about 20 to about 200. The average molecular weight of the polyol is from about 200 to about 20,000, preferably from about 80 to about 10,000.

The prepolymer may be prepared with a toluene disocyanate (TDI); the acrylic is preferably an acrylic latex, the gypsum is US Hydrostone gypsum and the surfactant is a preferably non-ionic surface active agent with from about 0.5 to about 5.0 percent surface active agent by weight of prepolymer added to the interpolymer, preferably from about 1.0 to about 2.0 percent surface active agent by weight of prepolymer. However, the formulations are preferably without latex.

Generally from about 6.5 to about 400 moles of water are reacted with the prepolymer, preferably from about 20 to about 200 moles of water. This differs from other urethanes where stoichiometric amounts of water are used.

The granulated product of this invention exhibits unexpected lipophilic characteristics and is able to release any absorbed contaminants and debris during a wash or cleaning process. Still another surprising characteristic of this mineral-abrasive polymer such as polyurethane/garnet/Wollastonite/staurolite interpolymer is its ability to be propelled against a surface to be treated to minimize or not create any dust or fine particulate matter upon impact. The produce of the invention useful for a variety of different applications, including the aforementioned.

The resultant composition is to be continuously mixed, poured, allowed to rise, gelled to tack-free and comminuted to a specific size. The foamed and sized composition is to be used in a relatively dry mode to remove foreign objects or coatings from hard or soft substrates.

The mineral abrasive may be present in a varied range of proportions in relation to the prepolymer. Generally the percentage of abrasive to total composition can vary from 1% to over 90%, more preferably in the 70 to 90% range. The abrasive is much lower in cost and higher in specific gravity so that its use at the highest level of addition is important in general cost as well as density. The particulate abrasive is preferably a water insoluble, Oh group mineral, such as sand, quartz, garnet, Wollastonite, carborundum diatomaceous earth, gypsum, etc.

A preferred abrasive is garnet for harder substrates and Wollastonite for softer substrates or minimal abrasiveness. Both are available from NYCO in N.Y.

The preferred prepolymer shall be mixed with an aqueous reactant phase containing the above abrasives.

Figure 1:
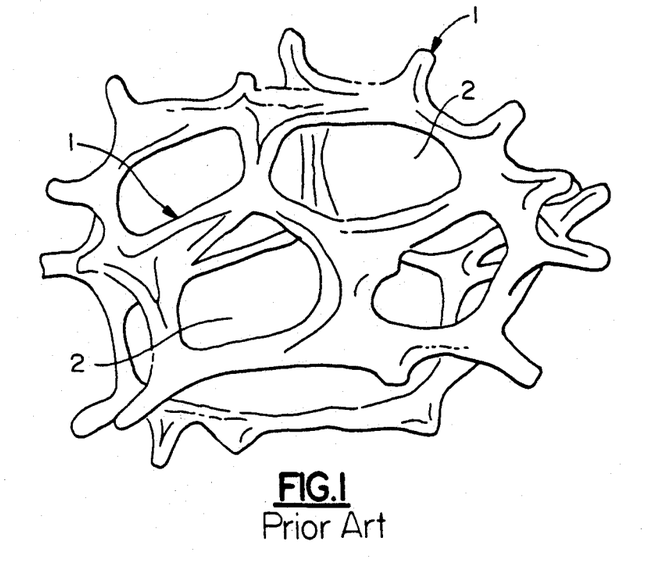
FIG. 1 is a diagrammatic representation of a prior art foam granule, such as the granule disclosed in U.S. Pat. No. 4,551,581.
Figure 2:
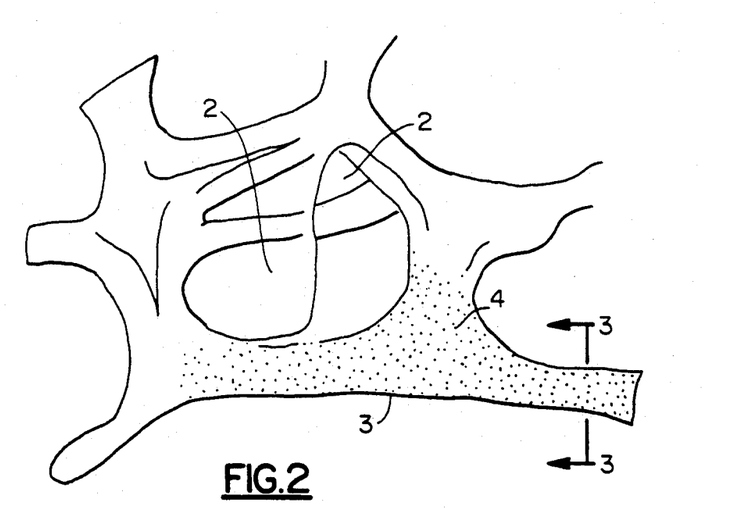
FIG. 2 is a diagrammatic representation of an improved granule of the present invention.
Figure 3:
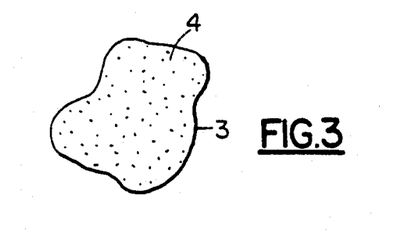
FIG. 3 is a diagrammatic cross section along section line 3—3 of FIG. 2.

Turning now to FIG. 1, a known prior art urethane strand 1 can be seen. The spacing 2 between adjacent urethane strands 1 is shown and the reticulation, which is well known in the art, is the ratio of the strands thickness versus the space. As can be seen in FIG. 2, the space 2 per strand 3 ratio achieved by the interpolymer made according to the present invention is less than that of prior art FIG. 1. This is because the thicker interpolymer strands 3 of the instant invention have an increased interpolymer distribution of urethane-Wollastonite 4 contained within its internal structure.

The interpolymer product is preferably prepared from an isocyanate capped polyether polyol prepolymer known as TREPOL(R) available from Twin Rivers Engineering Corporation of Boothbay, Maine. A-62 is a Trepol-like material also produced by Twin Rivers. Another similar product is available from W. R. Grace of Lexington, Mass. and known as HYPOL(R). Similarities exist between these two products, but TRE- POL(R) is preferred because of its higher tensile strength and lower cost.

The prepolymer is chemically reacted with a large molar excess of water, on the order of about 6.5 to about 400 moles. The water is provided as an aqueous solution containing other components, such as Wollastonite and/or Staurolite and a surfactant which are all readily dispersed or soluble within the water. If desired, the prepolymer and/or the aqueous mixture can contain one or more other active ingredients. For example, an activated carbon or aqueous mixture for absorption of specific obnoxious materials may also be included in the prepolymer.

In addition to the abrasive and the prepolymer other components such as surfactants, acids, suspension agents, etc., to enhance handling of for example the aqueous phase might contain 0.1% to 0.5% of pluronic F88 (BASF) to increase cell size or 10% to 5% of VGUM (Vanderbilt) to better suspend the abrasive, or 1%–8% oleic acid (Hercules) to aid in cleaning brass or copper. The additions of the above and other additives are known to those skilled in the art and minor possible additions to the total composition for adjusting and tailoring the final composition would be readily apparent to those skilled in the art.

Bactericide or fungicide can also be included in the medium to prevent bacterial or mold growth. The interpolymer media of the invention can be used to clean oil or contaminants from industrial equipment such as in machine shops, blow molds, paper mills, ducts, manufacturing plants, paint, restaurants etc. Oil contaminated rocks can be cleaned with vacuuming of the oil-soaked medium. Thus the material is useful for environmental cleaning, such as oil spills.

The cleaning media of the invention can be reused. The open cells appear to hold the grease or contaminant. In water the granules sink to the bottom while the grease, oil, etc., is released from the pores of the media and rises to the top. The oil or grease can be skimmed off so that only a small volume of contaminant needs to be properly disposed.

EXAMPLE 1

Firstly, an aqueous phase blend having the following composition is prepared prior to mixing with the prepolymer:

|  | Weight % AQV |
|---|---|
| US Gypsum HYDROSTONE (R) (Calcium Sulfate) | 65.3 |
| Union Carbide UCAR 154 (Acrylic Latex Emulsion) | 21.1 |
| BASF Pluronic F88 1% Sol in H2O | 13.60 |

Figures 4, 5:
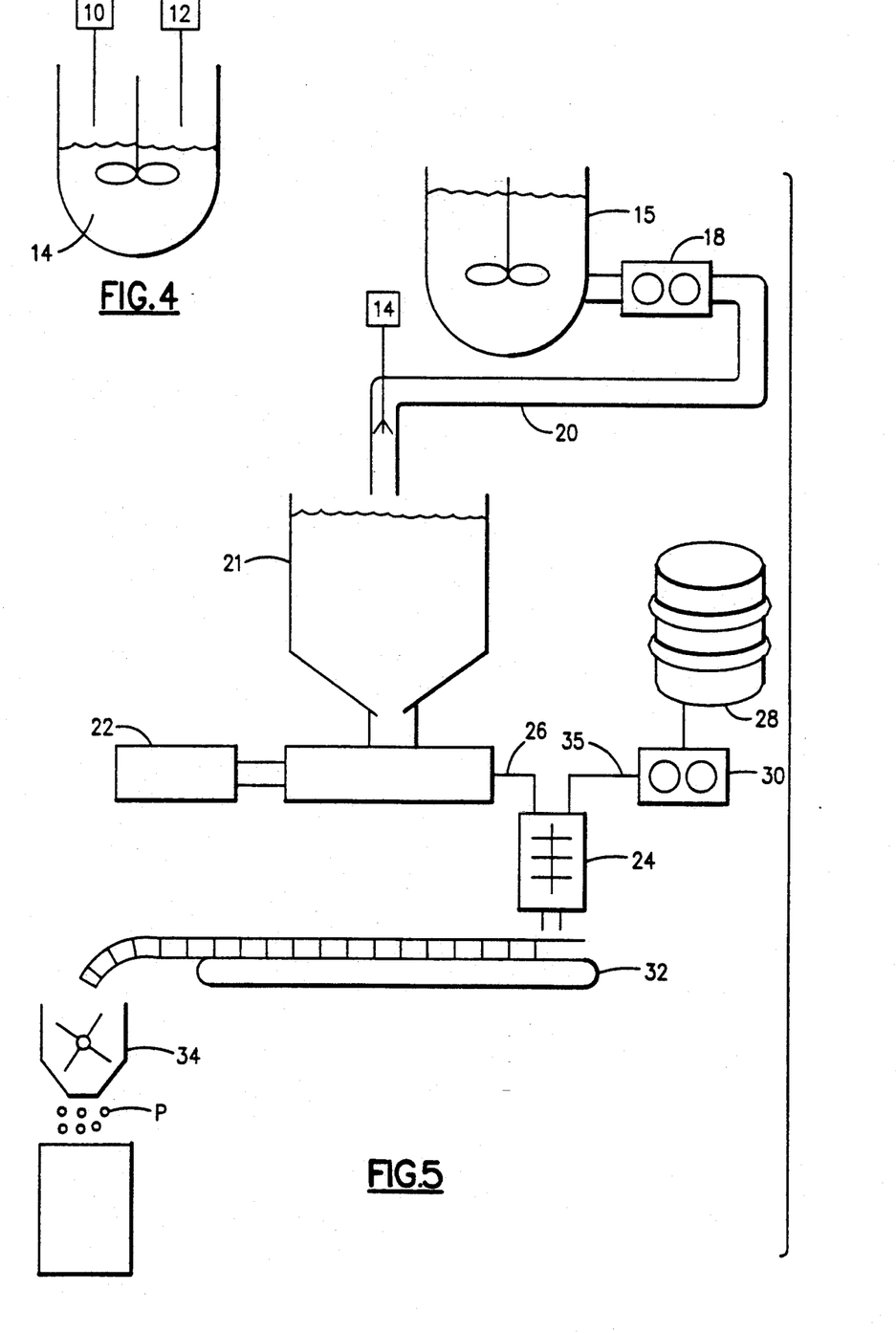
FIG. 4 is a block diagram showing a process for forming a first portion of the aqueous phase.
FIG. 5 is a block diagram showing a process for manufacturing an improved granule of the present invention.

To prepare the above product, the aqueous surfactant solution 10 and the acrylic latex 12 are continuously supplied in metered quantities and blended together in a container 14. The gypsum 15 is metered separately from container 16 into a discharge pipe 20 by a rotary valve 18, or the like, and allowed to fall by gravity toward a pump 22. The aqueous mixture of the surfactant and the latex from container 14 is metered and sprayed by suitable nozzle means onto the gypsum, in the desired proportion, as it falls in the discharge pipe 20. The pump 22 then pumps the admixture of the components toward a rotary mixer 24 via supply pipe 26. The prepolymer, i.e. the TREPOL(R), is metered from container 28 by a suitable valve 30 into the supply pipe 35 conveying the prepolymer to the rotary mixer 24. The mixture is combined with the prepolymer TREPOL(R) in a ratio of 4.75 parts admixture : 1 part prepolymer (TREPOL(R)), by weight. All of the components then enter the rotary mixer and are sufficiently mixed thereby and discharged onto an elongate continuous conveyer belt 32 were the product is allowed to foam and cure into a urethane strip.

The mixture immediately prior to curing, including the prepolymer, has approximately the following composition:

|  | WEIGHT % TOTAL |
|---|---|
| US Gypsum HYDROSTONE (R) (Calcium Sulfate) | 54.39 |
| Union Carbide UCAR 154 (Acrylic Latex Emulsion) | 17.43 |
| BASF Pluronic F88 1% Sol H2O | 11.23 |
| Twin Rivers Eng. TREPOL (R) | 17.39 |

The interpolymer produced according to the above procedure reacts as a typical polyurethane product, that is, the mixed product is in a fluid/cream state (emulsion) immediately after mixing which then increases in volume about 3 fold during approximately two minutes immediately following mixing as a result of the formation of carbon dioxide gases. The product then cures at room temperature on the conveyer belt 32. Most of the reacted components are "tack free" (i.e. nonsticky to the touch) after about 5 minutes after mixing and an additional 15 minutes or so is required to ensure that the acrylic latex is also "tack free". After this period of time (about 20 minutes total), the cured product is ground by a suitable grinder 34 into small individual particles of media having a diameter of about 1/20,000 to ¼ inch, preferably about 1/16 to ¼ inch. The ground media is then allowed to cure for an additional 6 to 8 hours so that the product is completely cured and can be packaged. If the product is ground before it is sufficiently cured, i.e. the product is still "tacky", it tends to clump together into large particles, after grinding, and is then too bulky to be used in the intended blasting equipment.

The product P manufactured from the above discussed process was tested in the intended blasting equipment and was found to have the following characteristics compared with the material of FIG. 1.

|  | Product (P) | Foam Per U.S. Pat. No. 4,551,481 |
|---|---|---|
| Dry Bulk Density | 0.6 | 0.3 |
| Angle Repose | 30° | 45° |
| Particle size (inches) | 1/16–¼ | 1/16–¼ |

EXAMPLE 2

A second formula of the invention has the following final mixture immediately prior to curing:

|  | Weight % AQV |
|---|---|
| US Gypsum HYDROSTONE (R) (Calcium Sulfate) | 54.12 |
| Rhom & Hass TR407 (Acrylic Latex Emulsion) | 4.2 |
| BASF Pluronic F88 10% Sol in H2O | 23.76 |

|  | Weight % AQV |
|---|---|
| Germicide GERMABEN II (R) (Sutton Laboratories, N.J.) | 0.41 |
| Twin Rivers Eng. TREPOL (R) | 17.50 |

In the above product, a germicide has been added to control the formation of fungus and other bacteria, a greater percent solution of F88 surfactant was used and the UCAR 154 acrylic latex has been replaced with a TR 407 acrylic latex which is cheaper in cost.

EXAMPLE 3-8

|  | % by Wt. Total Formula Example | | | | | |
|---|---|---|---|---|---|---|
|  | 3 | 4 | 5 | 6 | 7 | 8 |
| Calcium Sulphate |  |  | 54.34 | 54.12 | 54.12 | 60.56 |
| Water | 23.07 | 23.03 |  |  | 23.76 | 19.31 |
| Barium Sulphate | 66.20 | 66.06 |  |  |  |  |
| Silane | .52 | .52 |  |  |  |  |
| Phosphoric Acid | QS | QS |  |  |  |  |
| Bacteriocide | .54 | .54 | .5 | .41 | .41 | .42 |
| Triton X100 Surfactant |  | .18 |  |  |  |  |
| F88 Surfactant (10% Sol) |  |  | 10.87 | 23.76 |  |  |
| Ucar 154 (Acrylic) |  |  | 17.38 | 4.20 |  |  |
| Rhoplex TR407 (Acrylic) |  |  |  |  | 4.20 | 4.74 |
| Trepol (Prepolymer) |  |  | 17.34 | 17.5 | 17.5 | 14.9 |
| A-62 (Prepolymer) | 9.6 | 9.6 |  |  |  |  |

(QS as required to bring product to proper pH of about 7.8). In examples 3-8 the % are before curing.

It is to be appreciated that the above weight percentages are only examples of suitable amounts and are not to be construed as limiting the invention herein. It is anticipated that the gypsum can have a range of from about 10 to about 75%, the surfactant can have a range of from about 0.5 to about 10%, the acrylic latex can have a range from about 1 to about 25%, the prepolymer can have a range of from about 5 to about 95%. Thus it is seen that those skilled in the art can produce useful granules with varying proportions of materials as above. The removal of latex and/or surfactant as seen above also produced a useful granule. For the above formulations it has been found that gypsum is the most preferred alkaline earth sulphate material.

The latex which is an Acrylic Copolymer could be replaced with Styrene Butadiene Rubber Copolymers or Vinyl Chloride, or Vinyl Acetate, or Styrenated Acrylics.

The base acrylic latexes utilized in the present invention are well known in the art. They are generally prepared by polymerizing one or more alkyl acrylate and-/or methacrylates containing 1 to 18 carbon atoms in the alkyl group. One or more other copolymerizable monomers can also be included, selected from vinyl and vinylidene halides, carboxylic acids selected from $\alpha$-$\beta$-olefinically unsaturated carboxylic acids containing 3 to 5 carbon atoms and esters thereof containing 4 to 20 carbon atoms, mono-unsaturated dicarboxylic acids containing 4 to 8 carbon atoms nitriles selected from $\alpha,\beta$-olefinically unsaturated nitriles containing 3 to 5 carbon atoms; acrylamides derived from acrylic and methacrylic acids and their N-alkylol and N-alkoxy-alkyl derivatives containing 3 to 12 carbon atoms, polymerizable ethylenically unsaturated monocarboxylic and dicarboxylic acids containing 3 to 8 carbon atoms and esters thereof containing 4 to 20 carbon atoms, vinyl ethers containing 4 to 22 carbon atoms, vinyl ketones containing 3 to 12 carbon atoms; vinyl esters of carboxylic acids containing 4 to 22 carbon atoms; 0-olefins containing 2 to 12 carbon atoms, styrene and styrene derivatives; and other polyfunctional monomers.

The more common comonomers which are polymerized with one or more of the alkyl acrylates and/or methacrylates include styrene, acrylonitrile, acrylic acid, acrylamide, methacrylamide; N-methylol acrylamide, N-methylol methacrylamide, vinyl chloride, and itaconic acid; and other sulfates such as barium sulfate can be used.

EXAMPLE 9

An aqueous phase blend having the following composition is prepared prior to adding the prepolymer:

|  | Weight % (aqueous phase) |
|---|---|
| Water | 30.49 |
| Wollastonite | 67.11 |
| BASF Pluronic F88 (surfactant) | 2.40 |

To prepare the above product with reference to FIG. 5, the aqueous, surfactant, Wollastonite solution are blended together in a container 21. The pump 22 then pumps the admixture of the components to a rotary mixer 24 via supply pipe 26. The prepolymer, i.e. the TREPOL (R), is metered from container 28 by a suitable valve 30 into the supply pipe 35 conveying the admixture to the rotary mixer 24. The mixture is combined with the prepolymer TREPOL (R) in a ratio of 4.75 parts admixture : 1 part TREPOL (R), by weight. All of the components then enter the rotary discharged onto a continuous conveyer belt 32 where the product is allowed to foam and cure into a urethane strip.

The mixture (without latex) immediately prior to curing has approximately the following composition:

|  | WEIGHT % TOTAL |
|---|---|
| Water | 24.12 |
| Wollastonite | 53.1 |
| BASF pluronic F88 (surfactant) | 1.9 |
| Twin Rivers Eng. TREPOL (R) | 20.88 |

The interpolymer produced according to the above procedure reacts as a typical polyurethane product, that is, the mixed product is in a fluid/cream state (emulsion) immediately after mixing which then increases in volume about 3 fold during approximately two minutes immediately following mixing as a result of the formation of carbon dioxide gases. The product then cures at room temperature on the conveyer belt 32. Most of the reacted components are "tack free" (i.e. nonsticky to the touch) after about 5 minutes after mixing and an additional 15 minutes or so is required to ensure that the acrylic latex is also "tack free". After this period of time (about 20 minutes total), the cured product is ground by a grinder 34 into small individual particles of media having a diameter of about 1/20,000 to ¼ inch, preferably about 1/16 to ⅛ inch. The ground media is then allowed to cure for an additional 6 to 8 hours so that the product is completely cured and can be packaged. If the product is ground before it is sufficiently cured, i.e. the product is still "tacky", it tends to clump together into large particles, after grinding, and is then too bulky to be used in the intended blasting equipment.

The product P manufactured from the above discussed process was tested in the intended blasting equipment and was found to have the following characteristics compared with the material of FIG. 1.

|  | Product (P) | Foam Per U.S. Pat. No. 4,551,481 |
|---|---|---|
| Dry Bulk Density | 0.6 | 0.3 |
| Angle Repose | 30° | 45° |
| Particle size (inches) | 1/16-⅛ | 1/16-⅛ |

EXAMPLE 10

Another Example of the invention has the following final mixture immediately prior to curing:

|  | Weight % (aqueous phase) |
|---|---|
| Water | 4.21 |
| Wollastonite | 54.12 |
| BASF Pluronic F88 10% Solution in H₂O | 23.76 |
| Germicide GERMABEN II (R) (Sutton Laboratories, N.J.) | 0.41 |
| Twin Rivers Eng. TREPOL (R) | 17.50 |

In the above product, a germicide has been added to control the formation of fungus and other bacteria and a greater percent solution of F88 surfactant was used.

EXAMPLE 11-12

| Abrasive Formulation |  | Non-abrasive Formulation |
|---|---|---|
| 11.68% | water | 24.58% |
| 18.38% | Wollastonite (calcium metasilicate) | 52.95% |
| 0.73% | F88 (10% Solution) | 1.92% |
| 48.7% | "Starblast³" (Iron Aluminum Silicate) |  |
| 0.5% | "Silane" organo silane ester |  |
| 20.0% | Prepolymer (Trepol) | 21.05% |

EXAMPLE 13

The mineral and/or abrasive may be present in a varied range of proportions in relation to the prepolymer. Generally the percentage of abrasive to total composition can vary from 1% to over 90%, more preferably in the 70 to 90% range. The abrasive is much lower in cost and higher in specific gravity so that its use at the highest level of addition is important in overall cost is density.

The particulate abrasive is preferably a water insoluble, OH group bearing mineral, such as sands, Quartz, Garnet, Wollastonite, gypsum, carborundum, diatomaceous earth, etc.

A preferred abrasive is garnet for harder substrates and Wollastonite for softer substrates or minimal abrasivity both available from "NYCO" N.Y.

The preferred prepolymer shall be required to be mixed with an aqueous reactant phase containing the above abrasives. There is commercially available such prepolymers as described in U.S. Pat. No. 4,137,200 to W. R. Grace known as "Hypol". "Trepol" is manufactured by Rynel Corp. Boothbay, Me. The preferred prepolymer is Trepol with its lower cost, higher strength, and more absorption. In addition to the abrasive and prepolymer other components can be added to the aqueous phase such as surfactants, acids, suspension agents etc. to enhance handling or effectiveness.

For example, the aqueous phase might contain 0.1% to 0.5% of Pluronic F88 (BASF) to increase cell size, or 1% or 5% of V Gum (Vanderbilt) to suspend abrasive, or 1%-8% oleic acid (Hercules) to aid in cleaning brass and copper. The additions of the above and others are known to those skilled in the art and are minor additions to the total for taking the final composition.

FIG. 2 shows a cross section of a single particle of abrasive/urethane binder. The urethane binder may or may not contains additives, and the particle size may range from 1/32-¼" in envelop size.

1. Urethane Binder
2. Abrasive
3. Air Pocket

Further examples of components and ranges follow.

EXAMPLE 14

| Component | Range |
|---|---|
| Water | 2%-30% |
| Abrasive | 3%-70% |
| Thickener | 0.5-2% |
| Coupling Agent | 0.1-2.8% |
| Active Ingredient | 5-30% |
| Surfactant | 0.05-1.10% |
| Prepolymer | 4-20% |

The above ranges show the varying amounts of individual components able to be used. In general the temperature of the aqueous phase is about 60° F. and that of the polymer phase about 80° F.

Water - the water component is used to fluidize aqueous phase and react the prepolymer into foam.

Abrasive - the abrasive will abrade the soil yet not degrade the surface to be cleared.

Thickener - holds aqueous phase in suspension by increasing viscosity thickeners tested are conventional thickening agents such as Vee-gum, Carbipol, CMC, gums, etc.

Coupling agent - the coupling agent reacts onto selected abrasive and also reacts with urethane so as to bind abrasive into foam during comminutation and use.

Active ingredient - many actives can be added to satisfy the requirement such as detergents, acids, water soluble paint stripper, solids, oils, etc. Those skilled in the art may see the value of addition of many more.

Surfactant - The surfactant controls cell size and aids actives do the job. Non-ionic surfactants are preferred such as BASF pluronic series.

Prepolymer - A urethane forming flexible or semirigid is preferred similar to Trepol or Hypol so that it is absorbent of noxious material which it is to remove.

Figure 6:
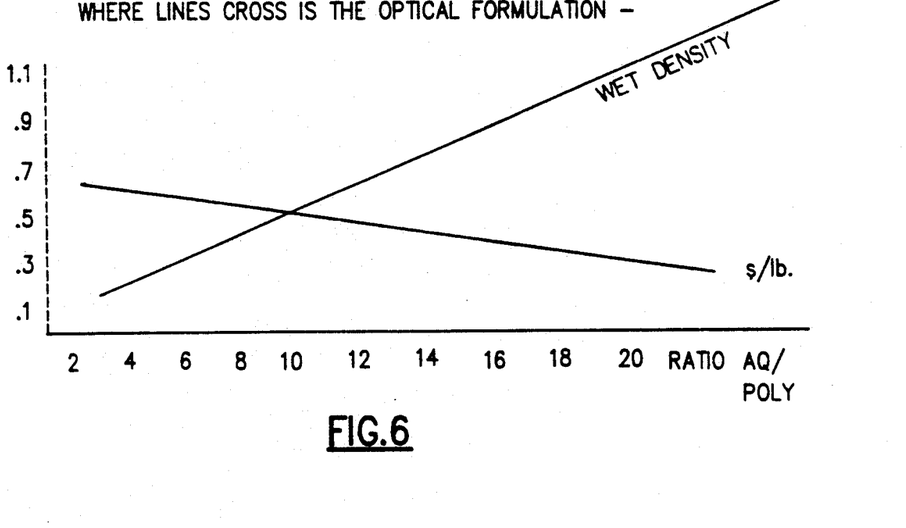
FIG. 6 is a diagram showing mineral content versus cost.

For all formulations showing usefulness in trials, a graph was set up to compare density vs cost (FIG. 6). As less prepolymer is used, the cost goes down. As more Aqueous phase is used, the wet density goes up. Where lines cross is the optimal formulation.

EXAMPLE 15

The following examples show various formulations tested:

| | 7/88 | 3/10 1990 | 4/11 1990 | 12/27 1990 | 2/12 1991 | 2/12 1991 | 4/2 Star | 4/03 Hiden | 7/23 Garnet |
|---|---|---|---|---|---|---|---|---|---|
| Exp. No. | 1 | 2 | 3 | 4 | 5 | 6 | 7 | 8 | 9 |
| Water | 38.4 | 19.78 | | 23.13 | 20.06 | 14.54 | 11.7 | 24.08 | 27.39 |
| Speed Dri | 45.2 | | | | | | | | |
| Silane | .5 | .5 | | .52 | | 1.3 | .24 | | .215 |
| 10% Surf | 6.8 | | 10.87 | | 2.02 | 1.45 | .73 | 1.92 | |
| Prepolymer | 9.1 | 9.1 | 17.39 | 9.09 | 25.0 | 20.0 | 20.0 | 21.05 | 17.45 |
| Feldspar | | 52.46 | | | | | | | |
| Triton X100 | | .09 | | | | | | | |
| Latex | | 18.0 | 17.4 | | | | | | |
| Vee Gum | | | | | | | | | .9 |
| Cal Sulphate | | | 53.93 | | | | | | |
| Bacteriacide | | | .41 | | | | | | |
| Barium Sulphate | | | | 66.2 | 52.7 | 37.81 | | | |
| Phosphoric Acid | | | | 1.06 | | | | | |
| Garnet | | | | | | | | | 43.13 |
| Color | | | | | .22 | | | | |
| Flintshot | | | | | | 26.04 | | | |
| Staurolite Sand | | | | | | | 48.95 | | |
| Wollastonite | | | | | | | 18.38 | 52.56 | 15.75 |
| Green base | | | | | | | | .39 | |
| Yellow base | | | | | | | | | .25 |

All formulas were tested for their use in machinery under patent application No. 376,764 filed Jul. 7, 1989 by Sponge Jet incorporated.

The foams were ground down to a size of 1/10-⅛ inch particle size and propelled oat a surface through the machine. Each particle hits and picks up the material to be removed. After use, the particles are collected and washed. Washing oil out of the particle is done by subjecting soiled particles to a water phase where foam particle sinks and oil floats. The oily floating debris is then decanted for hazardous waste removal and the foam particle is dried for reuse. The volume for hazardous waste removal is thereby reduced.

Understanding the above sets up criteria for the various desirable particle characteristics:

Density - Must flow through machine without bridging and allow propulsion through the air to hit substrate with impact. Requires 15-30 lb/cu ft. wet density.

Bulk Density - Ground up foam particles must maintain dry bulk density to satisfy above bulk density of 1.5-5.0 and above.

Angle of Repose - Must meet included angle of repose to flow in machine with minimal bridging in hopper and no plugging of nozzle.

Water Soluability - Particles must not be water soluble so that they will be able to go through the wash cycle without agglomerating.

Aggressiveness - Particles must be aggressive enough to remove soil yet not harm substrate. This is accomplished by selection of particle size and hardness of abrasive added in conjunction with polymer coating of particles.

Dusting - particles upon impact must not fracture and must produce little or no residual dusting during use.

Adsorption - particles must adsorb soil from substrate and allow cleaning for reuse. This is accomplished by adding selective active ingredients to aqueous phase.

EXAMPLE 16

A preferred medium brown formula using Staurolite (Starblast) is:

| | % Aqueous | % polymer | % total |
|---|---|---|---|
| Water | 14.6 | | 11.68 |
| F88 10% | 0.91 | | 0.73 |
| VEEGUM | 0.3 | | 0.24 |
| STARBLAST | 61.0 | | 48.8 |
| SILANE | 0.31 | | 0.25 |
| WOLLASTONITE | 22.88 | | 18.30 |
| TREPOL | | 100 | 20.00 |

| | Percent | Ratio | Temp °C. |
|---|---|---|---|
| Aqueous | 80 | 4 | 60 |
| Polymer | 20 | 1 | |

EXAMPLE 17

Another preferred hard yellow formulation using Garnet #50 (NYCO) is:

| | % Aqueous | % polymer | % total |
|---|---|---|---|
| Water | 8.79 | | 7.25 |
| 5% Vee Gum Solution | 19.32 | | 15.94 |
| Garnet #50 | 52.25 | | 43.13 |
| Silane A 1120 | .261 | | .215 |
| Wollastonite 10012 | 19.08 | | 15.75 |
| Yellow Base | .3 | | .25 |
| Trepol | | 100 | 17.45 |

| | Percent | Ratio | |
|---|---|---|---|
| Aqueous | 82.55 | 4.73 | |
| Polymer | 17.45 | 1 | |

EXAMPLE 18

A preferred soft green formulation using Wollastonite 10012 (NYCO) is:

| | % Aqueous | % polymer | % total |
|---|---|---|---|
| Water | 30.0 | | 24.08 |
| *Tamol SN | 0.5 | | 0.39 |
| 10% F88 Solution | 2.44 | | 1.92 |
| Wollastonite 10012 | 66.56 | | 52.54 |
| Green base | 0.5 | | 0.394 |
| Trepol | | 100 | 21.05 |

| | Percent | Ratio |
|---|---|---|
| Aqueous | 78.95 | 3.75 |
| Polymer | 21.05 | 1 |

*Tamol SN is a sodium salt of condensed naphthalene sulphonic acid and is supplied by Rohm and Haas.

It is found that Wollastonite toughens up the sponge, helps the sponge maintain itself for the cleaning cycle or for being wrung out, hardens and enhances the ability of the sponge to flow through the blasting or propelling machinery. Also un unexpected result is the reduction of flash rusting on carbon steel cleaned with use of Wollastonite.

Staurolite is present as in formulation where more abrasive aggressiveness is required. Garnet is used in the most abrasive aggressive application. To prepare the above abrasive formula the Iron Aluminum Silicate ("Starblast") Dupont, or Garnet (NYCO) is first treated with "Silane", A 1100 series @0.5% Silane to either abrasive. There is a chemical reaction of Silane onto either abrasive.

The aqueous phase components are added to a mix tank in order of addition, and mixed into a homogenous blend. The above Aqueous phase is shown in FIG. 4 and is pumped out of mix tank to holding tank in FIG. 5.

To take foam, the Aqueous phase is metered out of the holding tank in FIG. 5 with a metering pump. At the same time "Trepol" Prepolymer is metered out of 55 gallon storage drums and both streams in proper ratio are mixed in rotary mixer. The liquid output of mixer is deposited onto a conveyor belt whereon it rises and cures along the length of the belt. After curing, the foam is solid enough to be fed into a grinder, ground up, and fed through a sizing screen and packaged in bags.

The less abrasive product Example 18 is made similarly without the addition of addition abrasives and with changing the ratio of components. It is to be appreciated that the above weight percentages in the examples are only illustrative of suitable amounts and are not meant to limit the invention herein. The Wollastonite and/or can have a range of from about 10 to about 75%, the surfactant can have a range of from about 0.0 to about 10%, and the prepolymer can have a range of from about 5 to about 95%. Thus it is seen that those skilled in the art can produce useful granules varying proportions of materials as above. For the above formulations it has been found that metasilicates such as Garnet, Wollastonite and for Staurolite are the most preferred alkaline earth materials.

Mechanically U.S. Pat. No. 4,551,481 describes a highly reticulated (see FIG. 1) foam of 13 vm. It also describes a bun of low tensile strength. It has been found that the product of the instant invention is significantly higher in tensile strength while having a much lower reticulation (see FIG. 2). Mechanically U.S. Pat. No. 4,551,581 describes a highly reticulated (see FIG. 1) foam of 13 vm. It also describes a bun of low tensile strength. It has been found that the product of the instant invention is significantly higher in tensile strength while having a much lower reticulation (see FIG. 2).

A catalyst can be added to the aqueous and prepolymer components, if desired, to increase the speed of the chemical reactions for producing the product of the present invention. For instance, a terra alba additive can be added to the admixture while an amine may be added along with the prepolymer. In addition, the application of heat, in the range of 100° to 120° F., also decreases the reaction time.

The product of the present invention is particularly useful as a carrier of a wide variety of biologically active substances which have cleanup value, especially for the use in the clean up of hazardous materials. It is possible to achieve a substantially uniform distribution of such substances within the media by adding them to the aqueous components so that they can be homogeneously distribute and mixed throughout the product before curing.

A particular application for the product of the present invention, which fully exploits its advantageous properties, is in physical cleanup of industrial equipment found in a "machine shop", for instance. Recent Environmental Protection Agency regulations describe the by-product from a typical "power wash" (high pressure water & detergent) as a hazardous waste because the spent cleaning material (by-product) contains oil and other contaminants which have been removed during the cleaning process. The interpolymer product according to the present application, when propelled against soiled machinery, dislodges and absorbs all of the oil and other contaminants, does not affect surface finish of the machinery, is easily collected as a dry granule material, does not dust and/or contaminate the area being cleaned, and can be separated, recycled and re-used again. The residue oil or contaminant separated from the residue is then present in a small volume for disposal.

Wollastonite with prepolymer has been used to make round foam balls of about one inch in diameter to scrape i.e. clean the walls of tubes of the same inside diameter in nuclear power plants. Here the cleaning is done together with water pumped through the tubes. These balls contained additional polymer in addition to the Trepol.

In various environmental rules in different states, it is necessary to dispose of hazardous waste at a special waste disposal site if the waste level exceeds certain guidelines. This is expensive. Thus oil and grease from power wash may be 57,500 ppm while a state limit may be 5 ppm for discharge. Powerwash as in the prior art can produce large amounts of such materials. The invention controls levels to smaller volumes thus reducing hazardous waste disposal costs. Stringent rules in California often prohibit power wash of any kind. In Maine cleaning of paper mills requires notification of the local sewer district which then can refuse disposal or charge a fee. Smaller fees would be incurred since the invention leads to smaller volumes of contaminants. This avoids costly environmental clean-ups. A recent clean-up in Maine cost more than $4 million dollars.

For example, the invention can be used to remove lead paint softened by conventional strippers, or not. The granules are then totally incinerated, or separated from lead for disposal. The use of liquid strippers in the prior art creates a dangerous problem in removal of stripper plus lead paint. Testwork of the invention in Boston's Callahan tunnel reduced tetraethyl lead content on surfaces therein from 20,000 ppm to 40 ppm which is 10 times better than the EPA requirement of 400 ppm for safe conditions for workers.

Baking soda ($NaHCO_3$) is used in water-injected wash or blasting in the prior art. Water is used to suppress the dust from the baking soda. By mixing the soda with damp sponge material the soda present will continue to achieve the desired cleaning effect. Other cleaning media which produce dust can also be used in the above manner such as agricultural media as corn cob, walnut and also silica sand and any carbon product.

For other cleaning processes, the active ingredient product is first mixed into an aqueous phase, allowed to foam and ground into small particles for use in air blasting equipment. Each particle is then considered a minute absorbing sponge which, when place in water, would sink. This characteristic leads to easy separation of product from its absorbed contaminants. Spent or used foam particles, after removing any residual noxious contaminates, can be separated for proper disposal. The hazardous waste can then be reduced to its minimal volume, water can be reduced by evaporation and the like, rather than being emulsified in a large quantity of pressure wash effluent.

With respect to lead or other foreign solid matter, the particles of the invention containing the lead can be screened, the screened particles can be swollen by wetting and rescreened to separate the solid foreign matter from the particles. The particles may then be reused.

For product to be utilized in above described cleaning process, it is first chemically mixed, allowed to react and ground into small particles for use in air blasting equipment. Each particle is then considered a minute absorbing sponge which, when placed in water, would sink. This characteristic leads to easy separation of product from its absorbed contaminants. Spent or used product, after removing any residual oil from blasting equipment, can be separated from the media for proper disposal. The hazardous waste can then be reduced to its minimal volume, by evaporation and the like, rather than being emulsified in a large quantity of pressure wash effluent.

Figure 7:
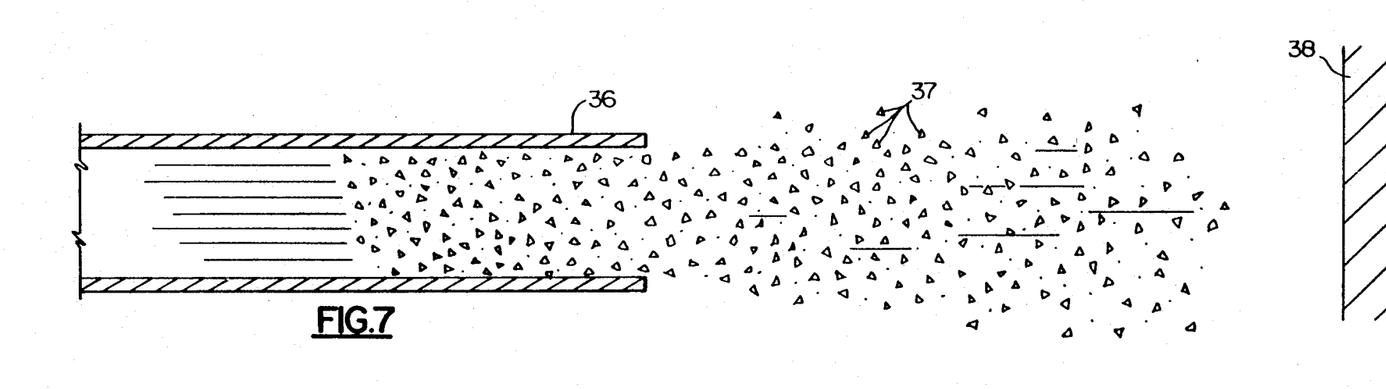
FIG. 7 is a diagrammatic cross-sectional view showing the discharge of prior art media from a nozzle of a suitable media propelling means.

With reference to FIG. 7 of the drawings, the discharge of a conventional blasting media from the discharge nozzle of suitable blasting equipment, which is well known in this art, is shown. As can be seen in that Figure, although the particles are somewhat uniformed in size, they are not entirely identical to one another in size, shape and/or weight. Moreover, due to their small size, a plurality of discrete particles must be employed for a single blasting operation. The Applicant theorizes that as the blasting media is discharged from the outlet of the nozzle 36, the individual particles 37 collide with one another and lose a portion of they impact (kinetic) energy prior to reaching the surface 38 to be cleaned. In addition, resistance of the air located between the outlet of the nozzle 36 and the surface 38 to be cleaned dissipates additional impact energy of the blasting media prior to reaching the surface thereby further reducing the impact force and penetration of the blasting media against the surface 38 being treated.

Figure 8:
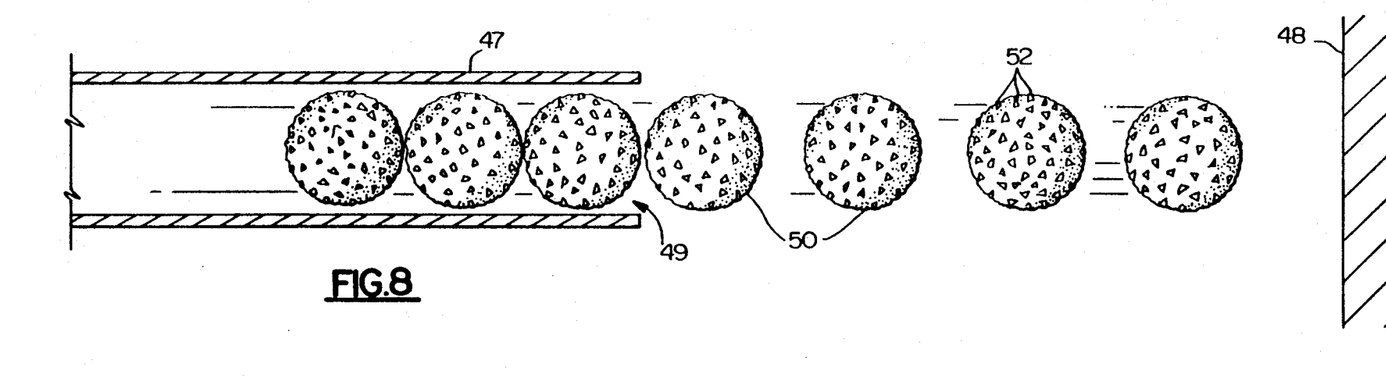
FIG. 8 is a diagrammatic cross-sectional view showing one form of the improved media of the present invention being discharged from a similar nozzle of a suitable media propelling means also.

Turning now to FIG. 8, an improved blasting media 50 of the present invention is shown diagrammatically. As can be seen in that figure, the improved media comprises larger particles than the individual particles forming the composite media and this decrease in the total number of particles require for a cleaning application, Applicant theorizes, minimizes the collision between adjacent particles as they are discharged from the outlet 49 of the nozzle 47. In addition, due to their larger particle size, the improved media 50 is believed to impact with greater energy and/or force against the surface to be treated 48 thereby to result in deeper penetration of the abrasive material 52, preferably protruding from the exterior surface of the blasting media at least a couple of mils, into the surface 48. The deeper penetration facilitates better and more effective surface preparation, especially if the surface is to be later coated with paint or another similar coating.

Figure 9:
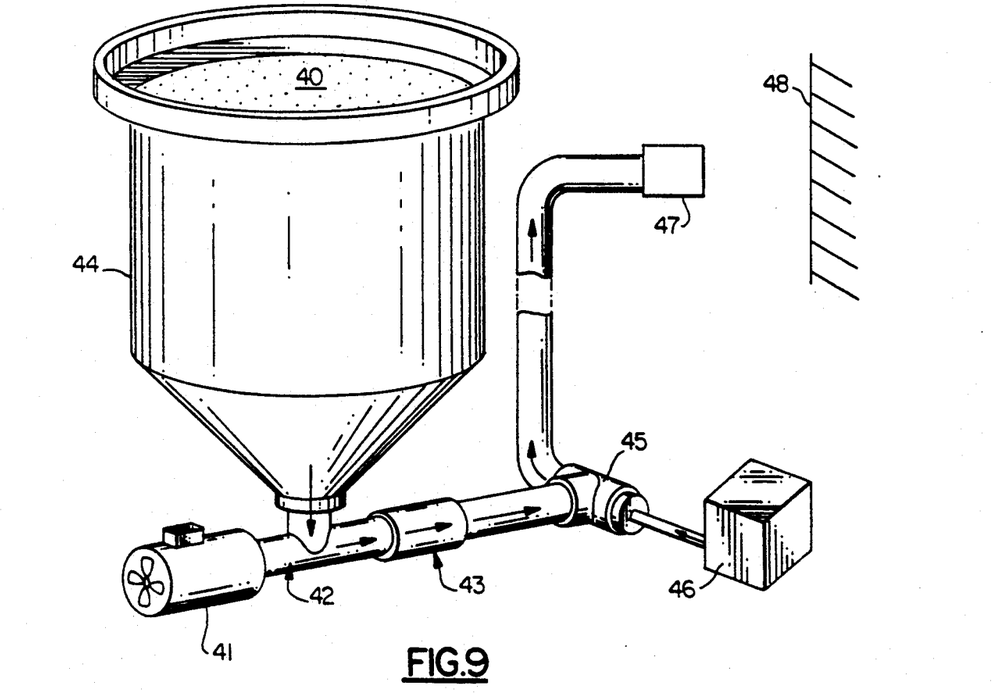
FIG. 9 diagrammatically shows a feed mechanism for supplying the blasting media to the blasting nozzle.

Suitable blasting equipment for propelling the improved media against a desired surface is shown in FIG. 9. As such equipment is well known in the art, it is only briefly discussed hereinafter. The improved composite media 40 is supplied to and contained within a hopper 44. An outlet of the hopper is connected with a positive feed mechanism 42 such as an auger driven by a motor 41. The auger conveys the blasting media 40 through a one way valve 43 toward a T-fitting 45. Pressurized air is supplied from air pressure source 46 to a second inlet of the T-fitting 45. The pressurized air in the conveying blasting media combined with one another and are mixed and conveyed out an outlet of the T-fitting 45 toward the nozzle 47 for a discharge against a desired surface 48.

Figure 10:
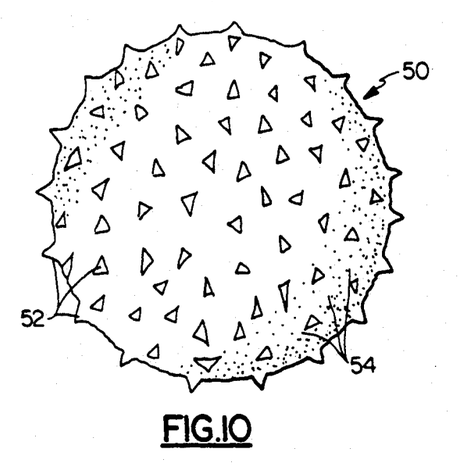
FIG. 10 diagrammatically shows an enlarged view of one blasting media particle of FIG. 8.

With reference to FIG. 10, the improved media 40 shown in FIG. 8 will now be described in detail. The improved media 50 typically comprises at least two components, the first component comprising a plurality of individual particles of at least one type of an abrasive component 52 which typically comprises any one of a variety of known abrasive materials, such as corn, plastic, Black Beauty (R), black walnut shell grit, sand, garnet or other abrasive grits, etc., depending upon the application, and the second component comprising a carrier component 54 for integrally interconnecting the plurality of abrasive particles with one another to form a plurality of larger discrete particles which are to be used as the blasting media in the blasting equipment. The carrier component 54 typically spaces each particle of the abrasive material from one another and generally falls into one of two categories, that is, it can be a component that either chemically bonds the abrasive components with one another to form a plurality of discrete particles or physically or mechanically entraps or encapsulates the plurality of abrasive particles to one another.

For chemically bonding the abrasive material into a larger particle, a variety of urethanes and epoxies may be employed. Alternatively, a slurry containing the abrasive material and a cellulose fiber may be formed and, once the liquid has evaporated and the cellulose fiber containing the abrasive materials sufficiently solidifies, the resulting composition may be ground into suitable sized particles.

It is also possible that the abrasive components may be glued to one another such as bonding the abrasive components to nylon fibers via a latex glue and, once the glue has hardened, grinding the resulting composition into suitably sized particles. Alternatively, recycled plastic milk containers may be melted into a liquid and mixed with the abrasive component, such as sand, and the resulting mixture allowed to solidify. The resulting composition may then be ground into suitably sized blasting media. Another possible combination would be to mix water and an abrasive component together and freeze and same and then chip the resulting composition into suitably sized blasting media and use immediately or freeze until use is required.

A still further variant is achieved by mechanically joining the abrasive component to the carrier component, for example, by squeezing a harder abrasive component under pressure into a softer carrier component.

Figure 11:
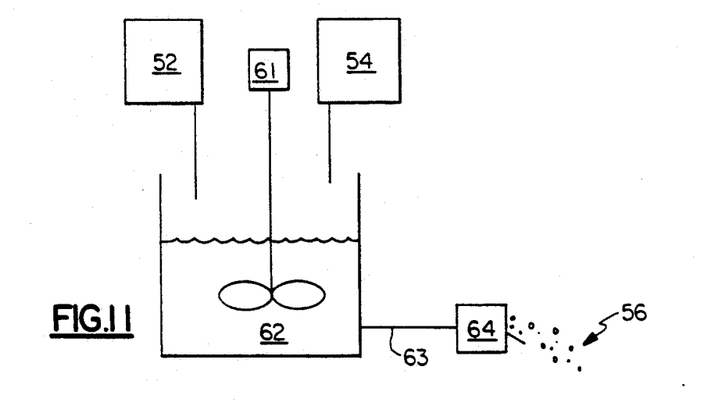
FIG. 11 diagrammatically shows a process for forming the improved blasting media of the present invention.

Turning now to FIG. 11, the method of forming the improved blasting media 50 of the present invention will now be described in reference to that figure. The discrete particle of the abrasive component 52 and the carrier component 54 are fed by conventional feed means into a mixing chamber 60 where the two components are mixed by an agitator 61 to form an admixture 62 thereof. Once the components have thoroughly mixed, the admixture 62 is allowed to set, harden or solidify and the resulting composition is then transported via a conveying mechanism 63 to a refining (grinding) device 64 where the solidified admixture is ground, chipped or broken into discrete particles of a desired size, each containing a substantially uniform quantity of the abrasive component(s) 52 and the carrier component(s) 54. The composite media 56 is then suitable for use in suitable blasting equipment for treating a surface to be cleaned.

An important aspect of the present invention is that, although the abrasive component 54 is incorporated into a larger composite media 56, the abrasive components 52 still have a substantially unaffected surface profile as the uncombined abrasive particles. This allows the abrasive components 52 of the composite media 50 to impact the surface to be treated and achieve maximum penetration into that surface. The Applicant has discovered that the maximum penetration into the surface is achieved by combining smaller abrasive particles, having a mesh size from about 20 to 80, preferably between 50 and 80, into larger particles achieves better surface penetration than merely increasing the particle size of the abrasive material. The composite particles typically have an average axial length or diameter ranging from about 1/32 of an inch to about 2 inches.

Figure 12A:
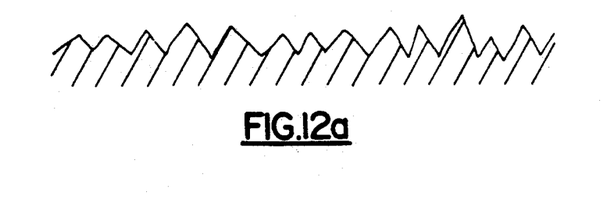
FIG. 12a is a diagrammatic cross-sectional view showing the surface profile of a surface treated by one of the blasting media of the present invention.
Figure 12B:
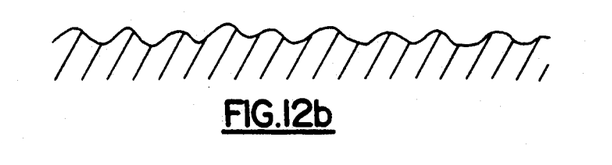
FIG. 12b is a diagrammatic cross-sectional view showing the surface profile of a surface treated by a prior art blasting media.

The Applicant has determined that a simple increase in the particle size of the abrasive material 52, although this may achieve slightly better surface penetration, results in an unacceptable surface texture. The reason for this is that larger 100% abrasive particles produce larger and smoother indentations in the surface to be treated as shown diagrammatically in FIG. 12b. However, paint and other similar coatings will adhere much better to a jaggered non-uniformed surface profile such as that obtained by the composite blasting media of the present invention as shown diagrammatically in FIG. 12a. In addition, the Applicant discovered that the composite media was able to penetrate the surface to a depth of approximately 2.0 mils while the blasting media alone was only able penetrated the surface approximately 1.5 mils.

The Applicant has conducted tests concerning a known prior art blasting media and a composite media 40 according to the present invention. In one experiment, the Applicant cleaned approximately 120 square feet of surface area in one hour of time using a 3/8 of an inch nozzle, 200 cubic feet per minute of air flow and approximately 700 pounds of blasting media. The Applicant was able to clean 60 square feet of surface area in one hour using 3/8 of an inch nozzle, 200 cubic feet per minute of air flow and approximately 150 pounds of a composite media consisting of substantially garnet and sponge. It is to be appreciated that the present invention utilized less than 50% of the blasting media and this is an important feature from a disposal stand point as the media typically must be properly disposed, especially if it contains hazardous waste removed from the surface to be cleaned.

It is contemplated that the abrasive component 52 and/or the carrier component 54 may vary from application to application. If the composite media 56 is being deployed against a very abrasive surface, this will generally cause the abrasive component to break down much quicker, typically after only a few cycles through the blasting equipment. Consequently, the carrier material 54 is chosen so that it also wears, chips or partially disintegrates after being recycled through the blasting media a few times so that a fresh underlayer of abrasive component 52 for treatment of the surface being cleaned is exposed. Depending upon the application, the carrier component is chosen to wear at the same rate of at a faster rate than the abrasive component. Alternatively, if the surface to be cleaned is relatively unabrasive, the abrasive particles may remain substantially intact after many cycles through the blasting equipment and the carrier material is typically chosen such that it disintegrates or wears only after being recycled through the blasting media many times. For example, if a surface 48 containing grease were to be cleaned, an open cell urethane could be used as the carrier component so that the outer exterior surface of the carrier component would, upon absorbing the grease, easily break or fracture away thereby exposing additional underlying carrier component 54 and/or abrasive components 52. In contrast, if a non-abrasive surface is to be cleaned, a closed cell urethane may be utilized as the carrier component which is much harder and wears at a much slower rate.

Figure 13:
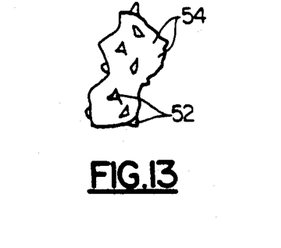
FIG. 13 diagrammatically shows a second embodiment of the blasting media according to the present invention.

In FIG. 13 is shown a further variant composite media 56 according to the present invention. In this embodiment the abrasive materials are combined with one another via a plastic, preferably a thermoplastic.

Figure 14:
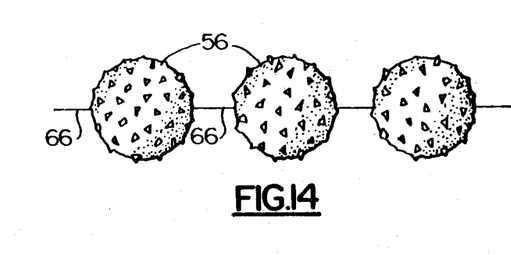
FIG. 14 diagrammatically shows a further embodiment of the blasting media according to FIG. 8.

FIG. 14 shows a further embodiment of the blasting media according to FIG. 8. In this embodiment each blasting media particle has a central flexible continuous support member such as a thin rope 66, extending therethrough. The composite media 56 are uniformly spaced along the length of the continuous rope 66. It is contemplated that the continuous media of FIG. 14 may be formed by molding in which the rope 66 is initially placed within the mold and then the admixture, supplied to the plurality of mold shaped balls, is allowed to solidify.

Figure 15:
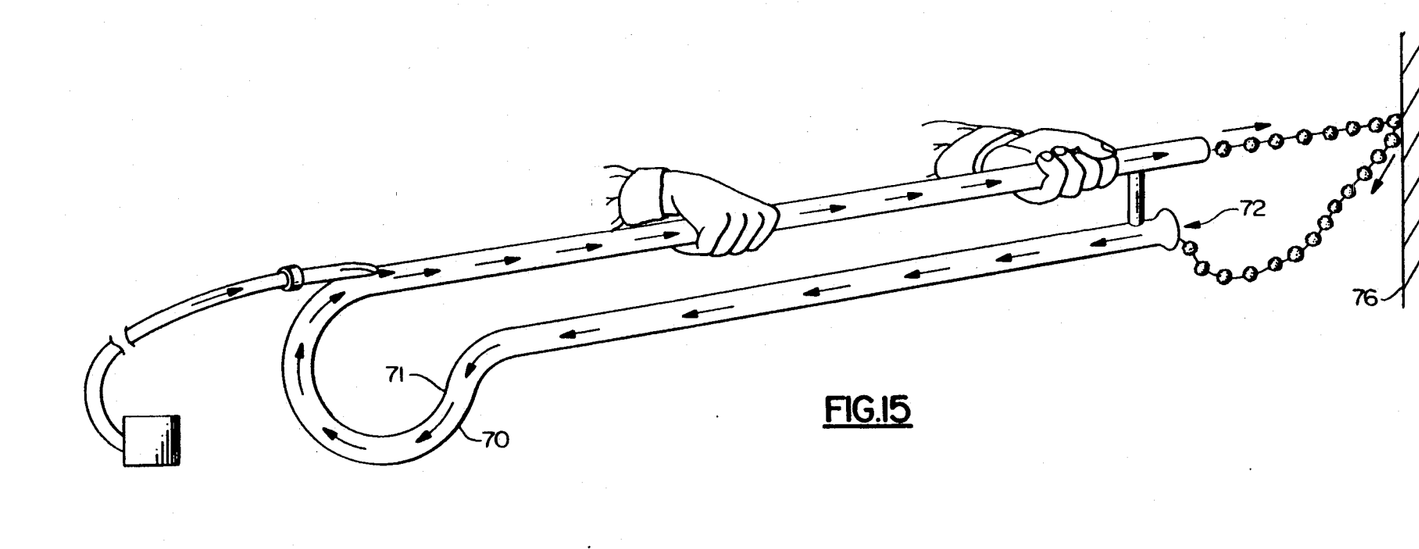
FIG. 15 shows blasting equipment suitable for discharging the blasting media of FIG. 14.

An apparatus for conveying the media of FIG. 14 is shown in FIG. 15. As can be seen in this figure, the apparatus comprises mating substantially U-shaped tubular members 70, 71 with are bolted or connected to one another to facilitate insertion of the continuous composite media. The U-shaped tubular members having a flared inlet 72 to assist with feeding of the continuous blasting media into the tubular members 70, 71. An air inner inlet 74 is located adjacent the base of the U-shaped member and connected to a suitable pressurized air source 46. When air is supplied at a sufficient pressure, via the air inlet 74, the pressurized air conveys the continuous length of media toward the outlet where the media is discharged against a surface 76 to be cleaned. It is to be appreciated that the exterior diameter of the composite media should closely conform to the inner diameter of the tubular members 70, 71 to minimize leakage of the pressurized air past the blasting media thereby to result in a suitable discharge velocity of the blasting media. When the blasting media has been sufficiently worn, i.e. it has reduced to a sufficiently small diameter so that air leaks past the inner wall of the tubular members and the exterior surface of the media, it may then be rebuilt to its initial diameter by remolding of the continuous media.

Figure 16:
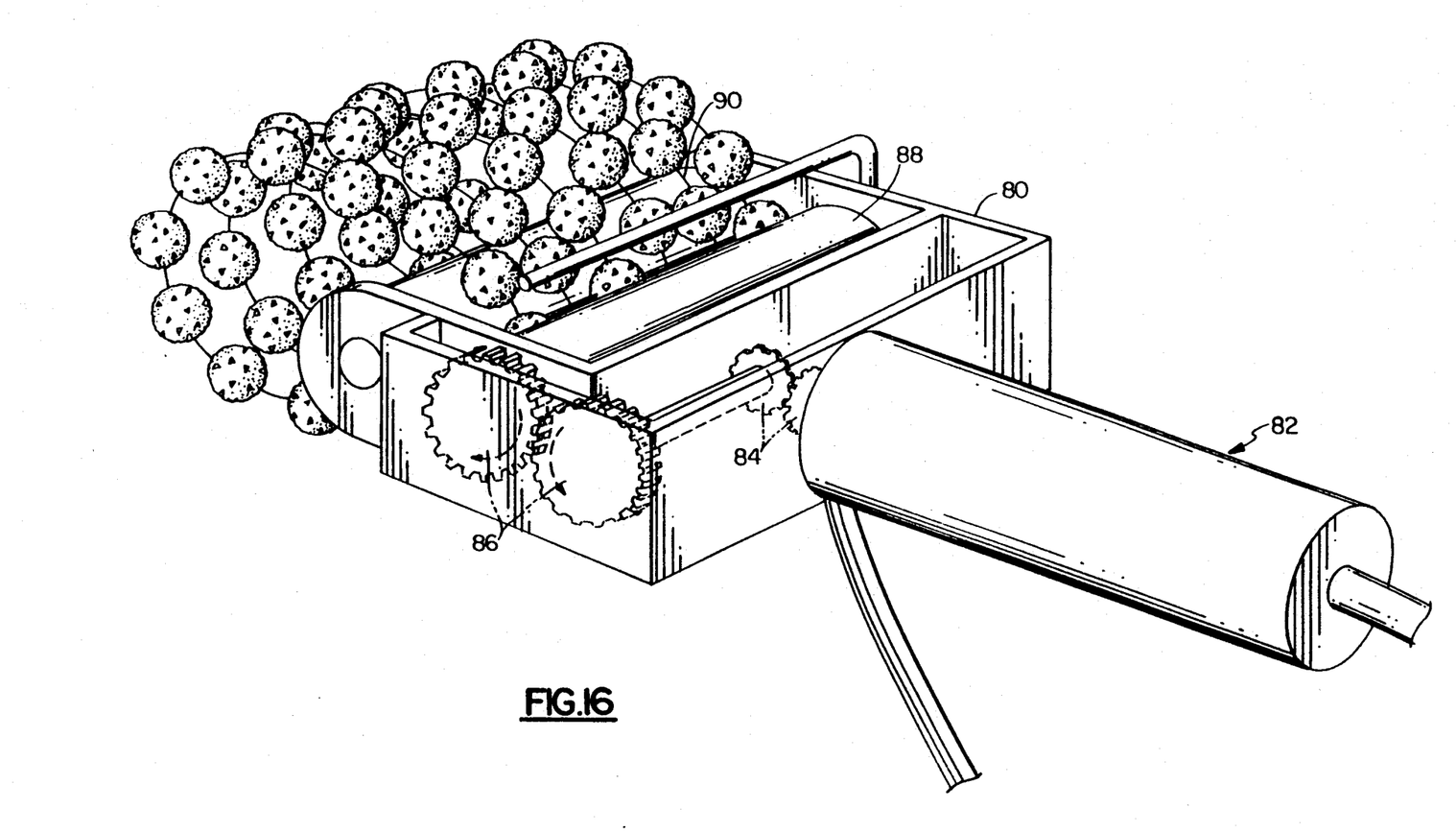
FIG. 16 shows a variant of the equipment suitable for discharging the blasting media of FIG. 14.

A final variant of the present invention relates to a mechanical conveying of a plurality of sequentially arranged continuous medias. In this embodiment, the media conveying apparatus 80 comprises an electric motor 82 which drives, via a pair of bevel gears 84 and a pair of mating gears 86, and a pair of mating pinch rollers 88, 90, at least one of which is biased toward the other, to convey the media against a desired surface.

While the above description relates specifically to mixing one abrasive component with one carrier component, it is to be understood that the composite media 56 may comprise a mixture of a plurality of different abrasive components contained within a single carrier component, a plurality of individual particles of a single type of an abrasive component contained within a plurality of combined carrier components or a plurality of kinds of abrasive components mixed with a plurality of combined carrier components. By appropriately selecting the abrasive component(s) and the carrier component(s), it is possible to customize the composite media to suit the surface to be treated and to assist with achieving desired wear of the carrier component.

It is also to be appreciated that the abrasive material can be an open-celled material which has the ability to absorb soot, dirt, grease or other hazardous solids and liquid components from the surface to be treated. If desired, the open-celled material may be impregnated with one or more solids or a desired liquid(s), such as a soap, to enhance the surface cleaning ability of the blasting media.

While the Applicant is not entirely sure why the composite media 56 of the present invention provides superior treatment of the surface to be treated, it is theorized that the enhanced surface treatment is related to the formula:

$$Energy = \tfrac{1}{2} \, Mass \, Velocity^2$$

The composite media 56 of the present invention is believed to increase the energy of the media by increasing the mass of the particle and/or maintaining the velocity of the particle as it is discharged out of the outlet 49 of the nozzle 47 at their maximum velocity by effectively reducing the amount of collisions with adjacent blasting media and minimizing the dissipation of energy due to air resistance. A further advantage of the composite media is believed to be due to the larger size of the particles which assists with superior flowability of the blasting media through the discharge nozzle, then know prior art medias, and results in a more uniformed application of the media against the surface to be treated. The larger particle size is also believed to minimize the generation of dust created when the abrasive material impacts against the surface 48 to be cleaned and facilitates easier separation of the blasting media from the fines and dust.

It is to be appreciated that if the carrier component has lighter density than the abrasive material, the carrier component typically will comprise a smaller percentage of the composite media so that the mass of each particle of the composite media is not significantly reduced.

Since certain changes may be made in the above described composite media without departing from the spirit and scope of the invention herein involved, it is intended that all subject matter contained in the above description and shown in the accompanying drawings shall not be construed as limiting the invention, but shall be interpreted merely as examples illustrating the inventive concept disclosed herein.

We claim:

1. A granulated composite blasting media for use in treating a surface to remove undesired contaminants therefrom, said granulated composite blasting media comprising a plurality of granules, each said granules containing a plurality of discrete particles of an abrasive component being physically interconnected with one another by a carrier component, said granules being suitable for being propelled, via a gaseous fluid stream, through blasting equipment, said carrier component wearing, during use, at a rate so as to continuously expose additional underlying abrasive particles on an exterior surface of that composite media particle but not at a rate to allow the premature separation of the abrasive particles from the exterior surface of that composite media particle.

2. A composite blasting media according to claim 1, wherein said composite blasting media is non-malleable and said carrier component wears at a rate faster than the rate of wear of the abrasive component.

3. A composite blasting media according to claim 1, wherein said carrier component wears at a rate substantially equal to the rate of wear of the abrasive component.

4. A composite blasting media according to claim 1, wherein said carrier component is one of an open cell urethane and a close cell urethane.

5. A composite blasting media according to claim 1, wherein said carrier component has a density at least as great as the density of the abrasive component.

6. A composite blasting media according to claim 1, wherein said carrier component has a density less than the density of the abrasive component.

7. A composite blasting media according to claim 1, wherein carrier components is selected so as to absorb a substantial portion of the energy created when the composite media particle impacts against the surface to be cleaned and thereby limits rebound of the composite media particle during use.

8. A composite blasting media according to claim 1, wherein each abrasive particle is at least partially spaced from each adjacent abrasive particle by said carrier component.

9. A composite blasting media according to claim 1, wherein each composite media particle is sufficiently larger in size than fine particulate matter and dust generated during use of the composite blasting media so as to facilitate separation of the generated fine particulate matter and dust from the recycled composite blasting media.

10. A composite blasting media according to claim 1, wherein each composite media particle is sufficiently sized so as to facilitate flowability of the composite blasting media through suitable blasting equipment and maximize impact energy of the composite blasting media against the surface being treated.

11. A composite blasting media according to claim 1, wherein said abrasive component has a mesh size of from about 20 to about 80 mesh.

12. A composite blasting media according to claim 1, wherein said composite blasting media has an average length of from about an 1/32 inch to about 2 inches.

13. A composite blasting media according to claim 1, said carrier component is one of chemically bonded and physically bonded with the abrasive component.

14. A method of forming a granulated composite blasting media for use in treating a surface to remove undesired contaminants therefrom, said method comprising the steps of:

forming a granulated composite blasting media comprising a plurality of granules, each said granules containing a plurality of discrete particles of an abrasive component physically interconnected with one another by a carrier component, said granules being suitable for being propelled, via a gaseous fluid stream, through blasting equipment, and selecting the carrier component to wear, during use of the composite blasting media, at a rate so as to continuously expose additional underlying abrasive particles on an exterior surface of that composite media particle but not at a rate to allow the premature separation of the abrasive particles from the exterior surface of that composite media particle.

15. A method according to claim 14, further comprising the step of using a carrier component which wears at a rate at least substantially equal to the rate of wear of the abrasive component.

16. A method according to claim 14, further comprising the step of adding a liquid cleanser to said carrier component.

17. A method according to claim 14, further comprising the step of absorbing, with said carrier component, a substantial portion of impact energy created when the composite media particle impacts against the surface to be cleaned and thereby limiting rebound of the composite media particle during use.

18. A method according to claim 14, further comprising the step of sufficiently sizing each composite media particle to facilitate flowability of the composite blasting media through suitable blasting equipment and maximize impact energy of the composite blasting media against the surface being treated.

19. A method according to claim 18, further comprising the step of sizing said composite blasting media to have an average length of from about an 1/32 inch to about 2 inches.

20. A method according to claim 14, further comprising the step of bonding said carrier component with the abrasive component by one of chemical and physical bonding.

* * * * *